(12) United States Patent
Grimm et al.

(10) Patent No.: US 12,459,534 B2
(45) Date of Patent: Nov. 4, 2025

(54) SYSTEM AND METHOD FOR CALCULATING A TURN COST FOR ROUTE SELECTION PURPOSES

(71) Applicant: GM Global Technology Operations LLC, Detroit, MI (US)

(72) Inventors: Donald K. Grimm, Utica, MI (US); Iain Cameron, LaSalle (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 240 days.

(21) Appl. No.: 18/325,479

(22) Filed: May 30, 2023

(65) Prior Publication Data
US 2024/0400087 A1  Dec. 5, 2024

(51) Int. Cl.
*G01C 21/00*   (2006.01)
*B60W 40/10*   (2012.01)
*B60W 60/00*   (2020.01)
*G01C 21/34*   (2006.01)

(52) U.S. Cl.
CPC .......... *B60W 60/001* (2020.02); *B60W 40/10* (2013.01); *G01C 21/3492* (2013.01)

(58) Field of Classification Search
CPC .. B60W 60/001; B60W 40/10; G01C 21/3492
See application file for complete search history.

(56) References Cited

U.S. PATENT DOCUMENTS

2020/0041295 A1* 2/2020 Stewart .............. G01C 21/3492

FOREIGN PATENT DOCUMENTS

WO   WO-2020243484 A1 * 12/2020 .......... B60W 30/146

OTHER PUBLICATIONS

Michael W. Sayers, Vehicle Offtracking Models, Transportation Research Record 1052, pp. 53-62, Ann Arbor, MI.
Redelbach et al., Impact of Lightweight Design on Energy Consumption and Cost Effectiveness of Alternate Powertrain Concepts, EEVC, Nov. 19-22, 2012, Brussels, Belgium.

* cited by examiner

*Primary Examiner* — Adnan M Mirza
(74) *Attorney, Agent, or Firm* — Vivacqua Crane, PLLC (57) ABSTRACT

A method for selecting a route along an intersection includes receiving map data, receiving vehicle telemetry data crowd-sourced from a plurality of remote vehicles. The method includes determining a sight distance using the map data, determining an average vehicle speed along the intersection using the vehicle telemetry data, determining a time available to navigate through the intersection using the sight distance and the average vehicle speed along the intersection, determining a ratio between the time available to navigate through the intersection and a time required to navigate the intersection, and determining a cost value of the intersection using the ratio between the time available to navigate through the intersection and the time required to navigate the intersection.

20 Claims, 2 Drawing Sheets

SYSTEM AND METHOD FOR CALCULATING A TURN COST FOR ROUTE SELECTION PURPOSES

INTRODUCTION

The present disclosure relates to a system and method for calculating turn costs for route selection purposes.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Sometimes vehicles tow trailers. These vehicle towing trailers may occasionally need to navigate an intersection and make a turn. A vehicle towing a trailer may need more space and time to turn at an intersection than a vehicle that is not towing a trailer.

SUMMARY

The present disclosure describes a system and method for calculating turn costs for route selection purposes. In an aspect of the present disclosure, the method can be used for selecting a route along an intersection for a vehicle and includes receiving map data. The map data includes geometric data about the intersection on a road. The vehicle is approaching the intersection on the road. The method further includes receiving vehicle telemetry data crowdsourced from a plurality of remote vehicles, where the vehicle telemetry data includes speeds of the plurality of remote vehicles traveling along the intersection of the road; determining a sight distance using the map data, determining an average vehicle speed along the intersection using the vehicle telemetry data, determining a time available to navigate through the intersection using the sight distance and the average vehicle speed along the intersection, determining a ratio between the time available to navigate through the intersection and a time required to navigate the intersection, and determining a cost value of the intersection using the ratio between the time available to navigate through the intersection and the time required to navigate the intersection. The method may include selecting a route based on the cost value of the intersection and commanding the vehicle to autonomously drive along the selected route. The method described in this paragraph improves vehicle technology by identifying the easiest route for the vehicle based on the difficulty of navigating through an intersection.

In an aspect of the present disclosure, the method includes determining a time needed for vehicle and a trailer attached to the vehicle to clear the intersection prior to an arrival of an oncoming traffic. In an aspect of the present disclosure, the method includes determining a time needed for vehicle and the trailer to navigate an intersection and subsequently reach target velocity without impeding the oncoming traffic. The vehicle telemetry data includes a plurality of paths taken by the plurality of remote vehicles along the intersection.

In an aspect of the present disclosure, the method further includes determining an average path along the intersection using the plurality of paths taken by the plurality of remote vehicles along the intersection, determining an inner path boundary along the intersection using the plurality of paths taken by the plurality of remote vehicles along the intersection, and determining an outer path boundary along the intersection using the plurality of paths taken by the plurality of remote vehicles along the intersection. In an aspect of the present disclosure, the method further includes comparing the average path with the inner path boundary and the outer path boundary to determine a maneuverability cost value of the intersection. In an aspect of the present disclosure, the method further includes taking into account the maneuverability cost value of the intersection to determine the cost value of the intersection.

The present disclosure also describes a tangible, non-transitory, machine-readable medium, comprising machine-readable instructions, that when executed by a processor, cause the processor to execute the method described above.

The present disclosure also describes a system for selecting a route along an intersection. The system includes a communication transceiver and a controller in communication with the communication transceiver. The controller is programmed to execute the method described above.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Reference will now be made in detail to several examples of the disclosure that are illustrated in accompanying drawings. Whenever possible, the same or similar reference numerals are used in the drawings and the description to refer to the same or like parts or steps.

Figure 1:
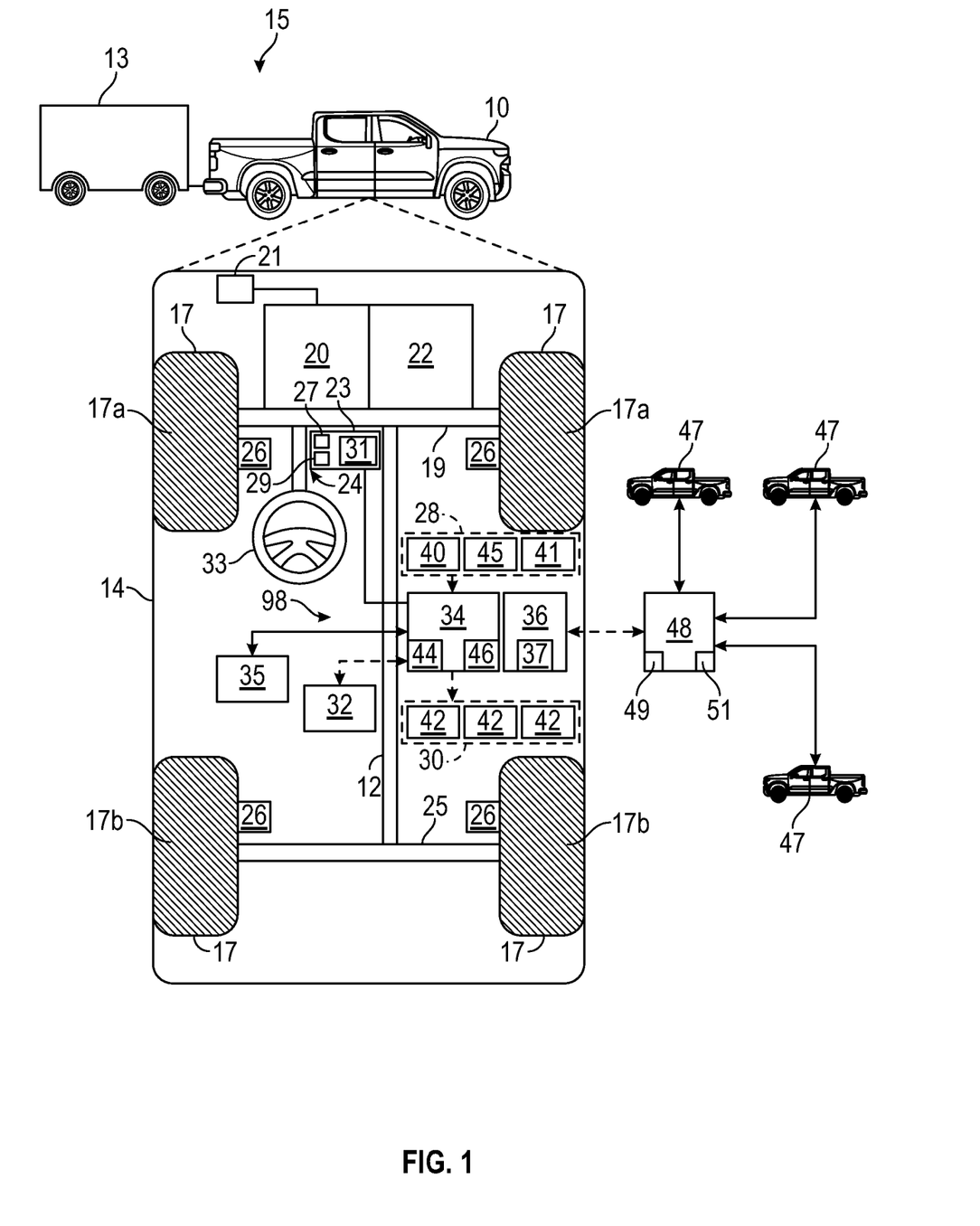
FIG. 1 is a block diagram depicting an embodiment of a vehicle including a system for calculating turn costs for route selection purposes.

With reference to FIG. 1, a host vehicle 10 generally includes a chassis 12, a body 14, front and rear wheels 17 and may be referred to as a vehicle system. In the depicted embodiment, the host vehicle 10 includes two front wheels 17a and two rear wheels 17b. The body 14 is arranged on the chassis 12 and substantially encloses components of the host vehicle 10. The body 14 and the chassis 12 may jointly form a frame. The wheels 17 are each rotationally coupled to the chassis 12 near a respective corner of the body 14. The host vehicle 10 includes a front axle 19 coupled to the front wheels 17a and a rear axle 25 coupled to the rear wheels 17b. The host vehicle 10 may be attached to a trailer 13. The methods 100 and 200 are not limited to a single trailer. Rather, the methods 100 and 200 may be applied to any number of trailers being pulled in tandem. The host vehicle 10 and the trailer 13 may be collectively referred to as a vehicle system 15.

In various embodiments, the host vehicle 10 may be an autonomous vehicle or a semi-autonomous vehicle and may be considered part of a system 98 for calculating a turn cost for route selection purposes using crowdsourcing. The system 98 may be referred to as the control system. In the present disclosure, the term "crowdsourcing" means seeking information from a plurality of remote vehicles 47. The host vehicle 10 is, for example, a vehicle that is automatically controlled to carry passengers from one location to another. The host vehicle 10 is depicted in the illustrated embodiment as a pickup truck, but it should be appreciated that other vehicles including trucks, sedans, coupes, sport utility vehicles (SUVs), recreational vehicles (RVs), etc., may also be used. In an embodiment, the host vehicle 10 may be a so-called Level Two, Level Three, Level Four, or Level Five automation system. A Level Four system indicates "high automation," referring to the driving mode-specific performance by an automated driving system of aspects of the dynamic driving task, even if a human driver does not respond appropriately to a request to intervene. A Level Five system indicates "full automation," referring to the full-time performance by an automated driving system of aspects of the dynamic driving task under a number of roadway and environmental conditions that can be managed by a human driver. In Level 3 vehicles, the vehicle systems perform the entire dynamic driving task (DDT) within the area that it is designed to do so. The vehicle operator is only expected to be responsible for the DDT-fallback when the host vehicle 10 essentially "asks" the driver to take over if something goes wrong or the vehicle is about to leave the zone where it is able to operate. In Level 2 vehicles, systems provide steering, brake/acceleration support, lane centering, and adaptive cruise control.

As shown, the host vehicle 10 generally includes a propulsion system 20, a transmission system 22, a steering system 24, a brake system 26, a sensor system 28, an actuator system 30, at least one data storage device 32, at least one vehicle controller 34, and a communication system 36. The propulsion system 20 may, in various embodiments, include an electric machine such as a traction motor and/or a fuel cell propulsion system. The host vehicle 10 may further include a battery (or battery pack) 21 electrically connected to the propulsion system 20. Accordingly, the battery 21 is configured to store electrical energy and to provide electrical energy to the propulsion system 20. In certain embodiments, the propulsion system 20 may include an internal combustion engine. The transmission system 22 is configured to transmit power from the propulsion system 20 to the vehicle wheels 17 according to selectable speed ratios. According to various embodiments, the transmission system 22 may include a step-ratio automatic transmission, a continuously-variable transmission, or other appropriate transmission. It is envisioned, however, that the host vehicle 10 may not include transmission system 22 if the propulsion system 20 is configured as an electric motor. The brake system 26 is configured to provide braking torque to the vehicle wheels 17. The brake system 26 may, in various embodiments, include friction brakes, brake by wire, a regenerative braking system such as an electric machine, and/or other appropriate braking systems. The steering system 24 influences the position of the vehicle wheels 17 and may include a steering wheel 33. While depicted as including a steering wheel 33 for illustrative purposes, in some embodiments contemplated within the scope of the present disclosure, the steering system 24 may not include a steering wheel 33.

The sensor system 28 includes one or more sensors 40 (i.e., sensing devices) that sense observable conditions of the exterior environment and/or the interior environment of the host vehicle 10. The sensors 40 are in communication with the vehicle controller 34 and may include, but are not limited to, one or more radars, one or more light detection and ranging (lidar) sensors, one or more proximity sensors, one or more odometers, one or more ground penetrating radar (GPR) sensors, one or more steering angle sensors, one or more Global Navigation Satellite System (GNSS) transceivers 45 (e.g., Global Positioning System (GPS) transceivers), one or more tire pressure sensors, one or more cameras (e.g., optical cameras and/or infrared cameras), one or more gyroscopes, one or more accelerometers, one or more inclinometers, one or more speed sensors, one or more ultrasonic sensors, one or more inertial measurement units (IMUs) 41 and/or other sensors. Each sensor 40 is configured to generate a signal that is indicative of the sensed observable conditions of the exterior environment and/or the interior environment of the host vehicle 10. Because the sensor system 28 provides data to the vehicle controller 34, the sensor system 28 and its sensors 40 are considered sources of information (or simply sources).

As discussed above, the sensor system 28 includes one or more Global Navigation Satellite System (GNSS) transceivers 45 (e.g., Global Positioning System (GPS) transceivers) configured to detect and monitor the route data (i.e., route information). The GNSS transceiver 45 is configured to communicate with a GNSS to locate the position of the host vehicle 10 in the globe. The GNSS transceiver 45 is in electronic communication with the vehicle controller 34.

The actuator system 30 includes one or more actuators 42 that control one or more vehicle features such as, but not limited to, the propulsion system 20, the transmission system 22, the steering system 24, and the brake system 26. In various embodiments, the vehicle features may further include interior and/or exterior vehicle features such as, but are not limited to, doors, a trunk, and cabin features such as air, music, lighting, etc.

The data storage device 32 stores data for use in automatically controlling the host vehicle 10. In various embodiments, the data storage device 32 stores defined maps of the navigable environment. In various embodiments, the defined maps may be predefined by and obtained from a remote system. For example, the defined maps may be assembled by the remote system and communicated to the host vehicle 10 (wirelessly and/or in a wired manner) and stored in the data storage device 32. The data storage device 32 may be part of the vehicle controller 34, separate from the vehicle controller 34, or part of the vehicle controller 34 and part of a separate system.

The host vehicle 10 may further include one or more airbags 35 in communication with the vehicle controller 34 or another controller of the host vehicle 10. The airbag 35 includes an inflatable bladder and is configured to transition between a stowed configuration and a deployed configuration to cushion the effects of an external force applied to the host vehicle 10. The sensors 40 may include an airbag sensor, such as an IMU, configured to detect an external force and generate a signal indicative of the magnitude of such external force. The vehicle controller 34 is configured to command the airbag 35 to deploy based on the signal from one or more sensors 40, such as the airbag sensor. Accordingly, the vehicle controller 34 is configured to determine when the airbag 35 has been deployed.

The vehicle controller 34 includes at least one vehicle processor 44 and a vehicle non-transitory computer readable storage device or media 46. The vehicle processor 44 may be a custom-made processor, a central processing unit (CPU), a graphics processing unit (GPU), an auxiliary processor among several processors associated with the vehicle controller 34, a semiconductor-based microprocessor (in the form of a microchip or chip set), a macroprocessor, a combination thereof, or generally a device for executing instructions. The vehicle computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the vehicle processor 44 is powered down. The vehicle computer-readable storage device or media 46 may be implemented using a number of memory devices such as PROMs (programmable read-only memory), EPROMS (electrically PROM), EEPROMs (electrically erasable PROM), flash memory, or another electric, magnetic, optical, or combination memory devices capable of storing data, some of which represent executable instructions, used by the vehicle controller 34 in controlling the host vehicle 10. The vehicle controller 34 of the host vehicle 10 may be programmed to execute the methods 100 and 400 described in detail below.

The instructions may include one or more separate programs, each of which comprises an ordered listing of executable instructions for implementing logical functions. The instructions, when executed by the vehicle processor 44, receive and process signals from the sensor system 28, perform logic, calculations, methods and/or algorithms for automatically controlling the components of the host vehicle 10, and generate control signals to the actuator system 30 to automatically control the components of the host vehicle 10 based on the logic, calculations, methods, and/or algorithms. Although a single vehicle controller 34 is shown in FIG. 1, embodiments of the host vehicle 10 may include a plurality of vehicle controllers 34 that communicate over a suitable communication medium or a combination of communication mediums and that cooperate to process the sensor signals, perform logic, calculations, methods, and/or algorithms, and generate control signals to automatically control features of the host vehicle 10.

In various embodiments, one or more instructions of the vehicle controller 34 are embodied in the control system 98. The host vehicle 10 includes a user interface 23, which may be a touchscreen in the dashboard. The user interface 23 may include, but is not limited to, an alarm, such as one or more speakers 27 to provide an audible sound, haptic feedback in a vehicle seat or other object, one or more displays 29, one or more microphones 31 and/or other devices suitable to provide a notification to the vehicle user of the host vehicle 10. The user interface 23 is in electronic communication with the vehicle controller 34 and is configured to receive inputs from a user (e.g., a vehicle operator or a vehicle passenger). For example, the user interface 23 may include a touch screen and/or buttons configured to receive inputs from a vehicle user 11. Accordingly, the vehicle controller 34 is configured to receive inputs from the user via the user interface 23. The host vehicle 10 may include one or more displays 29 configured to display information to the user (e.g., vehicle operator or passenger).

The communication system 36 is in communication with the vehicle controller 34 and is configured to wirelessly communicate information to and from one or more remote servers 48, such as but not limited to, remote systems at a remote call center (e.g., ON-STAR by GENERAL MOTORS). The remote server 48 may be a cloud-based system. In the present disclosure, the term "remote server" means a piece of computer hardware or software (computer program) that provides functionality for other programs or devices, called "clients". In this case, the clients are remote vehicles 47 and the host vehicle 10. In the present disclosure, the term "remote vehicle" means a vehicle that is not physically connected to the host vehicle or the remote server 48. As used herein the, the term, "remote server" means a server that is not physically connected to the host vehicle 10 and/or the remote vehicles 47. The remote server 48 may include a server controller 49 and a server non-transitory computer readable storage device or media 51. The server processor 49 may be a custom-made processor, a central processing unit (CPU), a graphics processing unit (GPU), an auxiliary processor among several processors associated with the vehicle controller 34, a semiconductor-based microprocessor (in the form of a microchip or chip set), a macroprocessor, a combination thereof, or generally a device for executing instructions. The server computer readable storage device or media 51 may include volatile and nonvolatile storage in read-only memory (ROM), random-access memory (RAM), and keep-alive memory (KAM), for example. KAM is a persistent or non-volatile memory that may be used to store various operating variables while the vehicle processor 44 is powered down. The server computer-readable storage device or media 51 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the control system 98. The remote server 48 may also include communication transceivers 37 to wirelessly transmit data to the host vehicle 10 and/or the remote vehicles 47. The server controller 49 may be programmed to execute the method 200 described in detail below.

In certain embodiments, the communication system 36 of the host vehicle 10 is a wireless communication system configured to communicate via a wireless local area network (WLAN) using IEEE 802.11 standards or by using cellular data communication. Accordingly, the communication system 36 may include one or more antennas and/or communication transceivers 37 for receiving and/or transmitting signals, such as cooperative sensing messages (CSMs). The communication transceivers 37 may be considered sensors 40. The communication system 36 is configured to wirelessly communicate information between the host vehicle 10 and the remote server 48. Further, the remote vehicles 47 may include all or some of the components of the host vehicle 10 described above. The remote server 48 is in communication with the host vehicle 10.

The system 98 includes the vehicle controller 34, which is specifically programmed to predict if sufficient time and space are available to comfortably navigate an intersection while the host vehicle 10 tows the trailer 13. Specifically, the system 98 provides an assessment of how difficult it will be for the vehicle system 15, which includes the host vehicle 10 and the trailer 13, to pass through an intersection. The added length and weight of the trailer 13 affects the time and space necessary for the host vehicle 10 to navigate an intersection. Trailers require additional space when turning due to geometric off-tracking characteristics, making maneuvering through certain intersections challenging. Drivers prefer navigation routes that do not pass through intersections with these challenging characteristics. The presently disclosed system 98 can predict sight distances and required-to-available turn times ratios at intersections based on map data and crowdsourced vehicle speeds. The system 98 can also predict turn maneuverability at intersections based on the vehicle/trailer geometry and crowdsourced vehicle paths. Then, the system 98 uses the turn time ratios and trailer off-tracking as part of the route selection process.

Figure 2:
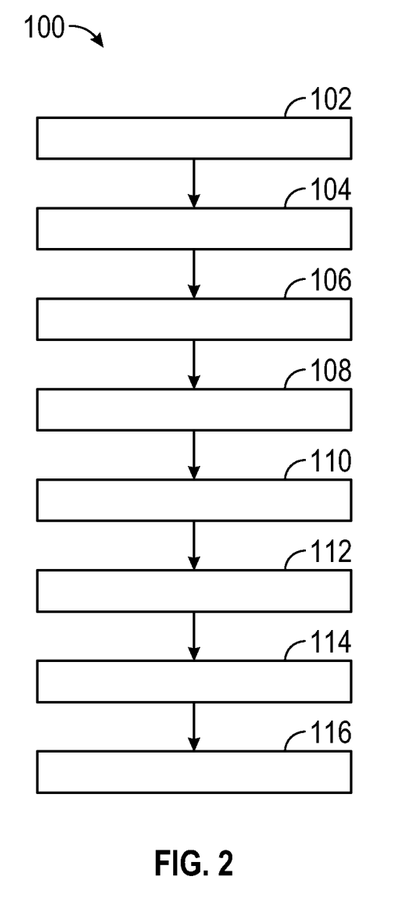
FIG. 2 is a flowchart of a method for determining turn time in an intersection.

FIG. 2 is a flowchart of a method 100 that uses map-based road geometry, combined with intersection and vehicle characteristics, to estimate when sight distances will be insufficient for trailering vehicles 10 to comfortably navigate the intersection when the host vehicle 10 approaches the intersection. The method 100 begins at block 102. At block 102, the vehicle controller 34 receives map data within a bounding area (e.g., bounding box or bounding radius around the intersection). The map data includes geometric data about the intersection on a road (e.g., polyline points). Each map polyline point has a latitude, a longitude, and an elevation. Also, at block 102, the vehicle controller 34 receives vehicle telemetry data crowdsourced from the remote vehicles 47. The vehicle telemetry data includes the speeds and paths of the remote vehicles 47 traveling along the intersection of the road. Then, the method 100 proceeds to block 104.

At block 104, the vehicle controller 34 converts the map data into points in a planar coordinate system. Specifically, the latitude and the longitude are converted into coordinates in a planar x-y coordinate system using equirectangular projection. The following equations may be used to determine the coordinates in the planar x-y coordinate system:

$$x = R(\lambda - \lambda_0) \cos \varphi_1 \qquad \text{Eq. 1}$$

$$y = R(\varphi - \varphi_0) \qquad \text{Eq. 2}$$

where:
R is the earth's radius;
$\lambda$ is the longitude of the polyline point;
$\varphi$ is the latitude of the polyline point;
$\lambda_0$ is the longitude at the intersection node;
$\varphi_0$ is the latitude at the intersection node; and
the intersection node is the polyline point at the road intersection.

At block 104, the road distance and elevation are transformed into coordinates in a planar p-z coordinate system. Then, the method 100 continues to block 106.

At block 106, the vehicle controller 34 determines the intersection characteristics. The intersection characteristics include information retrieved from the map data, such as the number of lanes, the presence or absence of a stop, the presence or absence of a traffic signal, and the turn angle. Further, the intersection characteristics includes information retrieved from the vehicle telemetry data crowdsourced from the remote vehicles 47 moving through the intersection, such as the average speeds along the intersection for each heading. Then, the method 100 continues to block 108.

At block 108, the vehicle controller 34 classifies the intersection using the intersection characteristics. As non-limiting examples, the classifications of the intersection may include stop-sign controlled intersections, unique stop-sign intersections, traffic-light controlled intersections, and uncontrolled intersections. The intersection classifications are then used to determine the relevant sight distances. For stop-sign controlled intersections, the relevant sight distances may be deduced based on the number of intersecting roads, the desired path through the intersection (i.e., left, right, straight), the total number of stop signs (i.e., controlled legs); whether the routing vehicle's entry heading is controlled, and whether the heading is to or from a one-way road. For unique stop-sign intersections, the relevant sight distances may be determined by taking into account the presence or absence of three stop signs at a 4-way intersection and the presence or absence of special conditions annotated below the stop sign. For traffic-light controlled intersections, the relevant sight distances may be segregated into an intersection with a dedicated left turn signal and an intersection without a dedicated left turn signal. There are no turn time costs for intersections with a dedicated left turn signal. Uncontrolled intersections are treated as all-way stops, which do not have a time-2-clear or time-2-speed requirement. Next, the method 100 proceeds to block 110.

At block 110, the vehicle controller 34 determines the maximum sight-line distance from the intersection before view obstruction is likely. The maximum sight-line sight distance (i.e., the sight distance) is determined for relevant sight distances (not for irrelevant sight distances). The sight distances are evaluated based on road curvature in both the horizontal and vertical planes. For the horizontal plane, the maximum sight-line distance is where the sight line is no longer within the bounds of the road and its shoulder. For the vertical plane, the maximum sight-line distance is where the sight line starts to pass through the road surface. The sight distances are determined directly from the geometry of the road, which is provided by the map polyline points along each leg of the intersection in the form of latitude, longitude, and elevation. The sight distance from an intersection along a particular heading is determined by incrementally calculating the offset distance between the current sight line and points along the road until an offset distance threshold is exceeded. To do so, the vehicle controller 34 first finds the first polyline point where the offset distance is greater than the offset distance threshold. The offset distance threshold is defined by the following equation:

$$d_{max} = n_{lanes} \cdot LW + SW \qquad \text{Eq. 3}$$

Where:
$d_{max}$ is the offset distance threshold;
$n_{lanes}$ is the number of lanes;
LW is the width of the lane; and
SW is the width of the shoulder.

The vehicle controller 34 may increase precision through linear interpolation between points (in case points are spaced far apart). Then, the vehicle controller 34 calculates the available turn time from the maximum sight distance. To do so, the vehicle controller 34 may use the following equation:

$$t_{sight\_max} = \frac{d_{sight\_max}}{v_{limit}} \qquad \text{Eq. 4}$$

$t_{sight\_max}$ is available turn time;
$d_{sight\_max}$ is the travel distance to the maximum view point; and
$v_{limit}$ is the intersection speed limit or an average value from crowd-sourced data.

At block 110, the vehicle controller 34 also determines the maximum sight-line distance due to road elevation. In this case, the maximum sight-line distance is determined as described above but with minor variations. First, the offset threshold is taken as the estimated average vehicle height (e.g., 1.5 meters). The driver's head height is added to the intersection node elevation to account for the increased view of taller vehicles. Only positive offsets are considered to impact visibility (i.e., where the line of sight would pass through the road). The coordinate system is taken as (p, z), where p is an approximation of the vertical plane parallel to the direction of travel. The sight distance calculation is performed in 2D. Thus, for the vertical sight distance, the point coordinates are in the vertical plane (z) along the direction of travel (p). Then, the method 100 proceeds to block 112.

At block 112, the vehicle controller 34 calculates the time available to navigate through the intersection (i.e., turn time) using the previously determined maximum sight-line distance and the average vehicle speed of the remote vehicles 47, which is obtained through crowdsourcing. By determining the turn time necessary to navigate through the intersection, the vehicle controller 34 identifies intersections that have insufficient time for turn navigation, due to sight obstruction from road curvature and/or grade, based on two metrics, namely: time-to-clear and time-to-speed. The time-to-clear is the time needed for the host vehicle 10 and the trailer 13 to clear an intersection prior to the arrival of oncoming traffic. The time-to-speed is the time needed for the host vehicle 10 and the trailer 13 to navigate the intersection and subsequently reach target velocity without impeding oncoming traffic. The time-to-clear may be determined using the following equations:

$$\text{Time-2-Clear} = C_{PWR} \cdot C_{t2c} \cdot \sqrt{\frac{2 \cdot d_{clear}}{a_{avg}}} \quad \text{Eq. 5}$$

$$d_{clear} = \pi \cdot R \cdot \alpha \cdot 180 + l_{vehicle} \quad \text{Eq. 6}$$

$$R = (n_{lanes} + 1/2) \cdot LW$$

where:
Time-2-Clear is the time-to-clear (i.e., the time needed for the host vehicle 10 and the trailer 13 to clear an intersection prior to the arrival of oncoming traffic);
$C_{PWR}$ is a predetermined weight coefficient;
$C_{t2c}$ is a predetermined grade coefficient, which is calculated using map data (intersection slope determined from polyline points);
$\alpha$ is the relative turn angle;
$l_{vehicle}$ is the combined length of the host vehicle 10 and the trailer 13;
LW is the lane width; and
$n_{lanes}$ is the number of lanes at the intersection.

The vehicle controller 34 may determine the time-to-speed using the following equations:

$$d_{accln} = \frac{1}{2} \frac{v_{limit}^2}{a_{avg}} \quad \text{Eq. 7}$$

$$d_{offset} \approx d_{accln} - \frac{1}{2} d_{turn} \quad \text{Eq. 8}$$

$$d_{gap} = v_{limit} \cdot t_{gap} \quad \text{Eq. 9}$$

$$d_{catch} = v_{limit} \cdot t_{accln} \quad \text{Eq. 10}$$

$$d_{sight\_min\_reqd} = d_{catch} + l_{vehicle} + d_{gap} - d_{offset} \quad \text{Eq. 11}$$

$$\text{Time\_2\_Speed} = C_{PWR} \cdot C_{t2s} \cdot \frac{d_{sight\_min\_reqd}}{v_{limit}} \quad \text{Eq. 12}$$

where:
$v_{limit}$ is the speed limit along the intersection;

$a_{avg}$ is the average driveaway acceleration of the host vehicle 10;
$d_{accln}$ is the required distance of the host vehicle 10 to achieve the desired velocity ($v_{limit}$) at the average acceleration rate ($a_{avg}$);
$d_{turn}$ is the turning distance along the intersection;
$t_{gap}$ is a predetermined time indicating the safe travel distance ($d_{gap}$) between two vehicles traveling at $v_{limit}$;
$t_{accln}$ is a time it takes the host vehicle 10 to reach the average vehicle speed after it has turned at the intersection;
$d_{gap}$ is the distance from the closest remote vehicle 47 to the host vehicle 10 after the host vehicle 10 has turned at the intersection;
$d_{catch}$ is the minimum distance that can be traversed by the closest remote vehicle 47 to the intersection before the host vehicle 10 will impede the remote vehicle's progress;
$l_{vehicle}$ is the combined length of the host vehicle 10 and the trailer 13;
$d_{offset}$ is the distance from the center of the intersection to the location of the closest remote vehicle 47 to the host vehicle 10 after the host vehicle 10 has turned at the intersection;
$d_{signt\_min\_read}$ is the minimum sight distance required;
Time_2_Speed is the minimum time required for the host vehicle 10 (which is attached to the trailer 13) to accelerate from rest to the target velocity (i.e., average speed vehicle) of a new heading without disturbing the flow of oncoming traffic at the intersection.

Then, the method 100 continues to block 114. At block 114, the vehicle controller 34 determines the time ratios for the time-to-clear and time-to-speed. The time ratios are the time available versus the time required (i.e., the previously determined time-to-clear and time-to-speed). The vehicle controller 34 then determines the cost value of the intersection using the time ratios for the time-to-clear and time-to-speed. For example, the cost value of the intersection may be proportional (e.g., directly proportional) to the time ratios for the time-to-clear and time-to-speed. Turn complexity may be assessed by traversing all the nodes and edges along a route provided by the routing engine. For each provided route, cost factors are accumulated and the route with the lowest score is presented as the preferred route. Route selection may be enhanced with other comfort metrics by using a utility function. The utility function may be as follows:

$$DC = \sum_{i}^{n} w_i x_i$$

where:
DC is driving comfort from a first point to a second point;
$x_i$ is the risk of the ith factor chosen from a list of potential factors below;
$w_i$ is the weighting factor of the ith risk; and
i is the risk factor, which may include lane edge condition, road grade, and propulsion stress.

Then, the method 100 continues to block 116. At block 116, the vehicle controller 34 selects the preferred route based on the cost value of the intersection. The preferred route is the route with the lowest cost. The selected route may be displayed on the user interface 23. Optionally, the vehicle controller 34 may command the host vehicle 10 to autonomously travel along the selected route.

Figure 3:
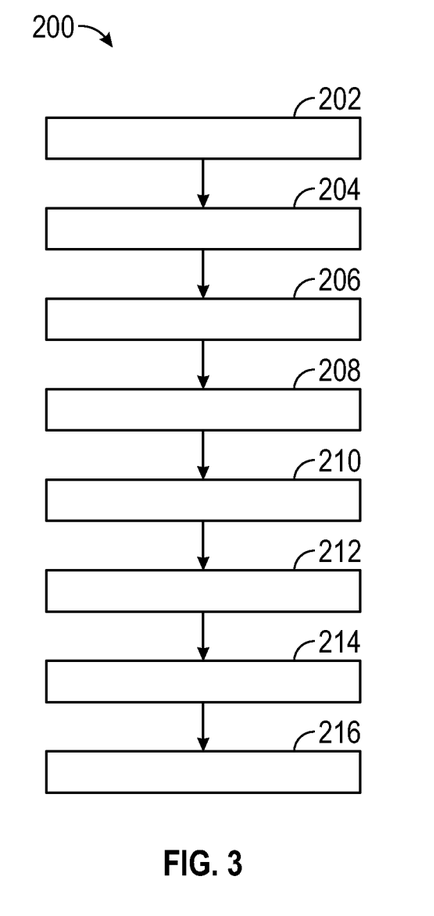
FIG. 3 is a flowchart of a method for determining turn maneuverability in the intersection.

FIG. 3 is a flowchart of a method 200 for determining turn maneuverability in the intersection. The intersection maneuverability is assessed by applying trailer off-tracking calculations to crowdsourced vehicle paths, which are subsequently used to predict the degree of maneuvering difficulty. The turn maneuverability model described by the method 200 uses vehicle telemetry paths, in conjunction with trailer off tracking calculations, to predict if sufficient space is available for a trailering vehicle to navigate a given intersection. The turn maneuverability model assesses whether the swept path of the host vehicle 10 and trailer 13 are going to exceed virtual boundaries generated from crowdsourced vehicle paths. The physical dimensions of the host vehicle 10 and the trailer 13 are required and can be input by the driver or potentially calculated from vehicle cameras. The method 200 begins at block 202.

At block 202, the vehicle controller 34 receives vehicle telemetry data crowdsourced from the remote vehicles 47. The vehicle telemetry data includes the paths of the remote vehicles 47 traveling along the intersection of the road. The paths of the remote vehicles 47 may be retrieved from a database that is generated using crowdsourced GPS telemetry data. Then, the method 200 continues to block 204.

At block 204, the vehicle controller 34 calculates an average steering path for each particular maneuver (e.g., a left turn, a right turn, etc.) through a given intersection using the paths of the remote vehicles 47 traveling along the intersection, which are obtained from crowdsourced vehicle telemetry data. Then, the method 200 proceeds to block 206.

At block 206, the vehicle controller 34 determines (e.g., calculates) an inner path boundary and an outer path boundary along the intersection based on the distribution of the paths crowdsourced by the plurality of remote vehicles 47 along the intersection. For example, the ninety-fifth percentile of the path distribution of the paths crowdsourced by the plurality of remote vehicles 47 along the intersection. Next, the method 200 proceeds to block 208.

At block 208, the vehicle controller 34 feeds the average steering path into a vehicle offtracking model, such as the vehicle offtracking models developed by Michael Sayers. The vehicle offtracking model outputs a swept path for the host vehicle 10 and the trailer 13. The trailer off-tracking/ swept path calculations are based on the incremental method of analysis. The basic premise of the incremental method of analysis is that each vehicle unit—a unit consisting of a steered and non-steered axle or a hitch pivot and a non-steered axle—is represented as a bicycle model and the coordinates of each axle are calculated using geometric relationships along incremental positions of the steering axle path. The incremental method of analysis assumes that for each incremental step, a vehicle unit travels along an arc of a fixed radius, which is determined by the current coordinates and heading angle at the given step. For sufficiently small steps, the positional error is deemed to be negligible. Then, the method 200 continues to block 210.

At block 210, the vehicle controller 34 spatially compares the swept path and the inner and outer path boundaries to predict the level of maneuvering difficulty. Then, the method 200 continues to block 212.

At block 212, the vehicle controller 34 then determines the turn cost based on the level of maneuvering difficulty. To determine the intersection cost value, the vehicle controller 34 uses the average steering path of the remote vehicles 47. Then, the vehicle controller 34 determines if the swept path exceeds the inner or outer path boundaries of the paths determined using the distribution of the paths of the remote vehicles 47. Then, the vehicle controller 34 determines the cost value, which may be proportional to the exceeding distance from the swept path to the inner or outer path boundaries of the paths determined using the distribution of the paths of the remote vehicles 47. Alternatively, the cost value may be a classification based on the exceeding distance, such as none, major or minor. In another example, the vehicle controller 34 uses the paths of the remote vehicles 47 along the intersection to map the intersection boundaries. Next, the vehicle controller 34 uses a path generation algorithm to find the maximum outer and inner paths possible for trailering. In this case, the cost could be proportional to the inner/outer path range or area (i.e., proportional to the amount of turn space available). Then, the method 200 continues to block 214.

At block 214, the vehicle controller 34 selects a route based on the cost value determined in block 212. The selected route may be the route with the lowest cost value. Next, the method 200 continues to block 216. At block 216, the vehicle controller commands the user interface 23 to display the selected route. Optionally, the vehicle controller 34 may command the host vehicle 10 to autonomously travel along the selected route.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for selecting a route along an intersection, comprising:
providing a host vehicle having a controller for receiving map data and vehicle data;
receiving the map data, wherein the map data includes geometric data about the intersection on a road, and an oncoming vehicle is approaching the intersection on the road;
receiving the vehicle telemetry data crowdsourced from a plurality of remote vehicles, wherein the vehicle telemetry data includes speeds of the plurality of remote vehicles traveling along the intersection of the road;
determining a sight distance using the map data;
determining an average vehicle speed along the intersection using the vehicle telemetry data;
determining a time available to navigate through the intersection using the sight distance and the average vehicle speed along the intersection;
determining a time required to navigate the intersection using:

$$d_{accln} = \frac{1}{2}\frac{v_{limit}^2}{a_{avg}};$$

$$d_{offset} \approx d_{accln} - \frac{1}{2}d_{turn};$$

$$d_{gap} = v_{limit} \cdot t_{gap};$$

$$d_{catch} = v_{limit} \cdot t_{accln};$$

$$d_{sight\_min\_reqd} = d_{catch} + l_{vehicle} + d_{gap} - d_{offset}; \text{ and}$$

$$\text{Time\_2\_Speed} = C_{PWR} \cdot C_{t2s} \cdot \frac{d_{sight\_min\_reqd}}{v_{limit}},$$

where:
$v_{limit}$ is speed limit along the intersection;
$a_{avg}$ is average driveaway acceleration of the host vehicle;
$d_{accln}$ is required distance of the host vehicle to achieve $v_{limit}$ at $a_{avg}$;
$d_{turn}$ is turning distance along the intersection;
$t_{gap}$ is predetermined time indicating safe travel distance ($d_{gap}$) between two vehicles traveling at $v_{limit}$;
$t_{accln}$ is time it takes the host vehicle to reach an average vehicle speed after it has turned at the intersection;
$d_{gap}$ is distance from closest remote vehicle to the host vehicle after the host vehicle has turned at the intersection;
$d_{catch}$ is minimum distance that can be traversed by the closest remote vehicle to the intersection before the host vehicle will impede the remote vehicle's progress;
$l_{vehicle}$ is length of the host vehicle;
$d_{offset}$ is distance from center of the intersection to location of the closest remote vehicle to the host vehicle after the host vehicle has turned at the intersection;
$d_{signt\_min\_regd}$ is minimum sight distance required;
$C_{PWR}$ is a predetermined weight coefficient;
$C_{t2c}$ is a predetermined grade coefficient, which is calculated using map data; and
Time 2 Speed is minimum time required for the host vehicle to accelerate from rest to $v_{limit}$ without disturbing flow of oncoming traffic at the intersection;
determining a ratio between the time available to navigate through the intersection and the time required to navigate the intersection;
determining a cost value of the intersection using the ratio between the time available to navigate through the intersection and the time required to navigate the intersection; and
driving the host vehicle autonomously on a preferred route being generated based on the cost value of the intersection to minimize difficulty of navigating through intersections.

2. The method of claim 1 wherein driving the host vehicle autonomously comprises:
selecting a preferred route based on the cost value of the intersection;
commanding the host vehicle to autonomously drive along the preferred route.

3. The method of claim 2, wherein determining the time available to navigate through the intersection using the sight distance and the average vehicle speed along the intersection includes determining a time needed for vehicle and a trailer attached to the vehicle to clear the intersection prior to an arrival of an oncoming traffic.

4. The method of claim 3, wherein determining the time available to navigate through the intersection using the sight distance and the average vehicle speed along the intersection includes determining a time needed for vehicle and the trailer to navigate intersection and subsequently reach target velocity without impeding the oncoming traffic.

5. The method of claim 4, wherein the vehicle telemetry data includes a plurality of paths taken by the plurality of remote vehicles along the intersection, and the method further includes:
   determining an average path along the intersection using the plurality of paths taken by the plurality of remote vehicles along the intersection;
   determining an inner path boundary along the intersection using the plurality of paths taken by the plurality of remote vehicles along the intersection; and
   determining an outer path boundary along the intersection using the plurality of paths taken by the plurality of remote vehicles along the intersection.

6. The method of claim 5, further comprising:
   comparing the average path with the inner path boundary and the outer path boundary to determine a maneuverability cost value of the intersection.

7. The method of claim 6, wherein determining the cost value of the intersection includes taking into account the maneuverability cost value of the intersection to determine the cost value of the intersection.

8. A tangible, non-transitory, machine-readable medium, comprising machine-readable instructions, that when executed by a processor of a host vehicle, cause the processor to:
   receive map data and vehicle data, wherein the map data includes geometric data about an intersection on a road, and an oncoming vehicle is approaching the intersection on the road;
   receive the vehicle telemetry data crowdsourced from a plurality of remote vehicles, wherein the vehicle telemetry data includes speeds of the plurality of remote vehicles traveling along the intersection of the road;
   determine a sight distance using the map data;
   determine an average vehicle speed along the intersection using the vehicle telemetry data;
   determine a time available to navigate through the intersection using the sight distance and the average vehicle speed along the intersection;
   determine a time required to navigate the intersection using:

$$d_{accln} = \frac{1}{2} \frac{v_{limit}^2}{a_{avg}};$$

$$d_{offset} \approx d_{accln} - \frac{1}{2} d_{turn};$$

$$d_{gap} = v_{limit} \cdot t_{gap};$$

$$d_{catch} = v_{limit} \cdot t_{accln};$$

$$d_{sight\_min\_reqd} = d_{catch} + l_{vehicle} + d_{gap} - d_{offset}; \text{ and}$$

$$\text{Time\_2\_Speed} = C_{PWR} \cdot C_{r2s} \cdot \frac{d_{sight\_min\_reqd}}{v_{limit}},$$

where:
   $v_{limit}$ is speed limit along the intersection;
   $a_{avg}$ is average driveaway acceleration of the host vehicle;
   $d_{accln}$ is required distance of the host vehicle to achieve $v_{limit}$ at $a_{avg}$;
   $d_{turn}$ is turning distance along the intersection;
   $t_{gap}$ is predetermined time indicating safe travel distance ($d_{gap}$) between two vehicles traveling at $v_{limit}$;
   $t_{accln}$ is time it takes the host vehicle to reach an average vehicle speed after it has turned at the intersection;
   $d_{gap}$ is distance from closest remote vehicle to the host vehicle after the host vehicle has turned at the intersection;
   $d_{catch}$ is minimum distance that can be traversed by the closest remote vehicle to the intersection before the host vehicle will impede the remote vehicle's progress;
   $l_{vehicle}$ is length of the host vehicle;
   $d_{offset}$ is distance from center of the intersection to location of the closest remote vehicle to the host vehicle after the host vehicle has turned at the intersection;
   $d_{signt\_min\_reqd}$ is minimum sight distance required;
   $C_{PWR}$ is a predetermined weight coefficient;
   $C_{r2c}$ is a predetermined grade coefficient, which is calculated using map data; and
   Time 2 Speed is minimum time required for the host vehicle to accelerate from rest to $v_{limit}$ without disturbing flow of oncoming traffic at the intersection;
   determine a ratio between the time available to navigate through the intersection and a time required to navigate the intersection;
   determine a cost value of the intersection using the ratio between the time available to navigate through the intersection and the time required to navigate the intersection; and
   drive the host vehicle autonomously on a preferred route being generated based on the cost value of the intersection to minimize difficulty of navigating through intersections.

9. The tangible, non-transitory, machine-readable medium of claim 8, wherein to drive the host vehicle autonomously comprises machine-readable instructions, that when executed by the processor, causes the processor to:
   select the preferred route based on the cost value of the intersection;
   command the host vehicle to autonomously drive along the preferred route.

10. The tangible, non-transitory, machine-readable medium of claim 9, wherein the tangible, non-transitory, machine-readable medium, further comprising machine-readable instructions, that when executed by the processor, causes the processor to:
   determine a time needed for vehicle and a trailer attached to the vehicle to clear the intersection prior to an arrival of an oncoming traffic.

11. The tangible, non-transitory, machine-readable medium of claim 10, wherein the tangible, non-transitory, machine-readable medium, further comprising machine-readable instructions, that when executed by the processor, causes the processor to:
   determine a time needed for vehicle and the trailer to navigate intersection and subsequently reach target velocity without impeding the oncoming traffic.

12. The tangible, non-transitory, machine-readable medium of claim 11, wherein the vehicle telemetry data includes a plurality of paths taken by the plurality of remote vehicles along the intersection, and the tangible, non-transitory, machine-readable medium, further comprising machine-readable instructions, that when executed by the processor, causes the processor to:

determine an average path along the intersection using the plurality of paths taken by the plurality of remote vehicles along the intersection;
determine an inner path boundary along the intersection using the plurality of paths taken by the plurality of remote vehicles along the intersection; and
determine an outer path boundary along the intersection using the plurality of paths taken by the plurality of remote vehicles along the intersection.

13. The tangible, non-transitory, machine-readable medium of claim 12, wherein the tangible, non-transitory, machine-readable medium, further comprising machine-readable instructions, that when executed by the processor, causes the processor to:
compare the average path with the inner path boundary and the outer path boundary to determine a maneuverability cost value of the intersection.

14. The tangible, non-transitory, machine-readable medium of claim 13, wherein the tangible, non-transitory, machine-readable medium, further comprising machine-readable instructions, that when executed by the processor, causes the processor to:
take into account the maneuverability cost value of the intersection to determine the cost value of the intersection.

15. A system for selecting a route along an intersection, comprising:
a communication transceiver;
a controller of a host vehicle for receiving map data and vehicle data, the controller being in communication with the communication transceiver, wherein the controller is programmed to:
receive the map data, wherein the map data includes geometric data about the intersection on a road, and an oncoming vehicle is approaching the intersection on the road;
receive the vehicle telemetry data crowdsourced from a plurality of remote vehicles through the communication transceiver, wherein the vehicle telemetry data includes speeds of the plurality of remote vehicles traveling along the intersection of the road;
determine a sight distance using the map data;
determine an average vehicle speed along the intersection using the vehicle telemetry data;
determine a time available to navigate through the intersection using the sight distance and the average vehicle speed along the intersection;
determine a time required to navigate the intersection using:

$$d_{accln} = \frac{1}{2} \frac{v_{limit}^2}{a_{avg}};$$

$$d_{offset} \approx d_{accln} - \frac{1}{2} d_{turn};$$

$$d_{gap} = v_{limit} \cdot t_{gap};$$

$$d_{catch} = v_{limit} \cdot t_{accln};$$

$$d_{sight\_min\_reqd} = d_{catch} + l_{vehicle} + d_{gap} - d_{offset}; \text{ and}$$

$$\text{Time\_2\_Speed} = C_{PWR} \cdot C_{t2s} \cdot \frac{d_{signt\_min\_reqd}}{v_{limit}},$$

where:
$v_{limit}$ is speed limit along the intersection;
$a_{avg}$ is average driveaway acceleration of the host vehicle;
$d_{accln}$ is required distance of the host vehicle to achieve $v_{limit}$ at $a_{avg}$;
$d_{turn}$ is turning distance along the intersection;
$t_{gap}$ is predetermined time indicating safe travel distance ($d_{gap}$) between two vehicles traveling at $v_{limit}$;
$t_{accln}$ is time it takes the host vehicle to reach an average vehicle speed after it has turned at the intersection;
$d_{gap}$ is distance from closest remote vehicle to the host vehicle after the host vehicle has turned at the intersection;
$d_{catch}$ is minimum distance that can be traversed by the closest remote vehicle to the intersection before the host vehicle will impede the remote vehicle's progress;
$l_{vehicle}$ is length of the host vehicle;
$d_{offset}$ is distance from center of the intersection to location of the closest remote vehicle to the host vehicle after the host vehicle has turned at the intersection;
$d_{signt\_min\_reqd}$ is minimum sight distance required;
$C_{PWR}$ is a predetermined weight coefficient;
$C_{t2c}$ is a predetermined grade coefficient, which is calculated using map data; and
Time 2 Speed is minimum time required for the host vehicle to accelerate from rest to $v_{limit}$ without disturbing flow of oncoming traffic at the intersection;
determine a ratio between the time available to navigate through the intersection and a time required to navigate the intersection;
determine a cost value of the intersection using the ratio between the time available to navigate through the intersection and the time required to navigate the intersection; and
drive the host vehicle autonomously on a preferred route being generated based on the cost value of the intersection to minimize difficulty of navigating through intersections.

16. The system of claim 15, wherein to drive the host vehicle autonomously, the controller is programmed to:
select a preferred route along the intersection based on the cost value of the intersection; and
command the host vehicle to autonomously drive along the preferred route along the intersection.

17. The system of claim 16, wherein the controller is programmed to determine a time needed for vehicle and a trailer attached to the vehicle to clear the intersection prior to an arrival of an oncoming traffic.

18. The system of claim 17, wherein the controller is programmed to determine a time needed for vehicle and the trailer to navigate intersection and subsequently reach target velocity without impeding the oncoming traffic.

19. The system of claim 18, wherein the vehicle telemetry data includes a plurality of paths taken by the plurality of remote vehicles along the intersection, and the controller is programmed to:
determine an average path along the intersection using the plurality of paths taken by the plurality of remote vehicles along the intersection;
determine an inner path boundary along the intersection using the plurality of paths taken by the plurality of remote vehicles along the intersection; and
determine an outer path boundary along the intersection using the plurality of paths taken by the plurality of remote vehicles along the intersection.

20. The system of claim 19, wherein the controller is programmed to compare the average path with the inner path boundary and the outer path boundary to determine a maneuverability cost value of the intersection.

* * * * *